Nov. 30, 1965   R. G. MORRIS   3,220,510
SAFETY APPLIANCE FOR ELEVATORS
Filed April 29, 1963   3 Sheets-Sheet 1
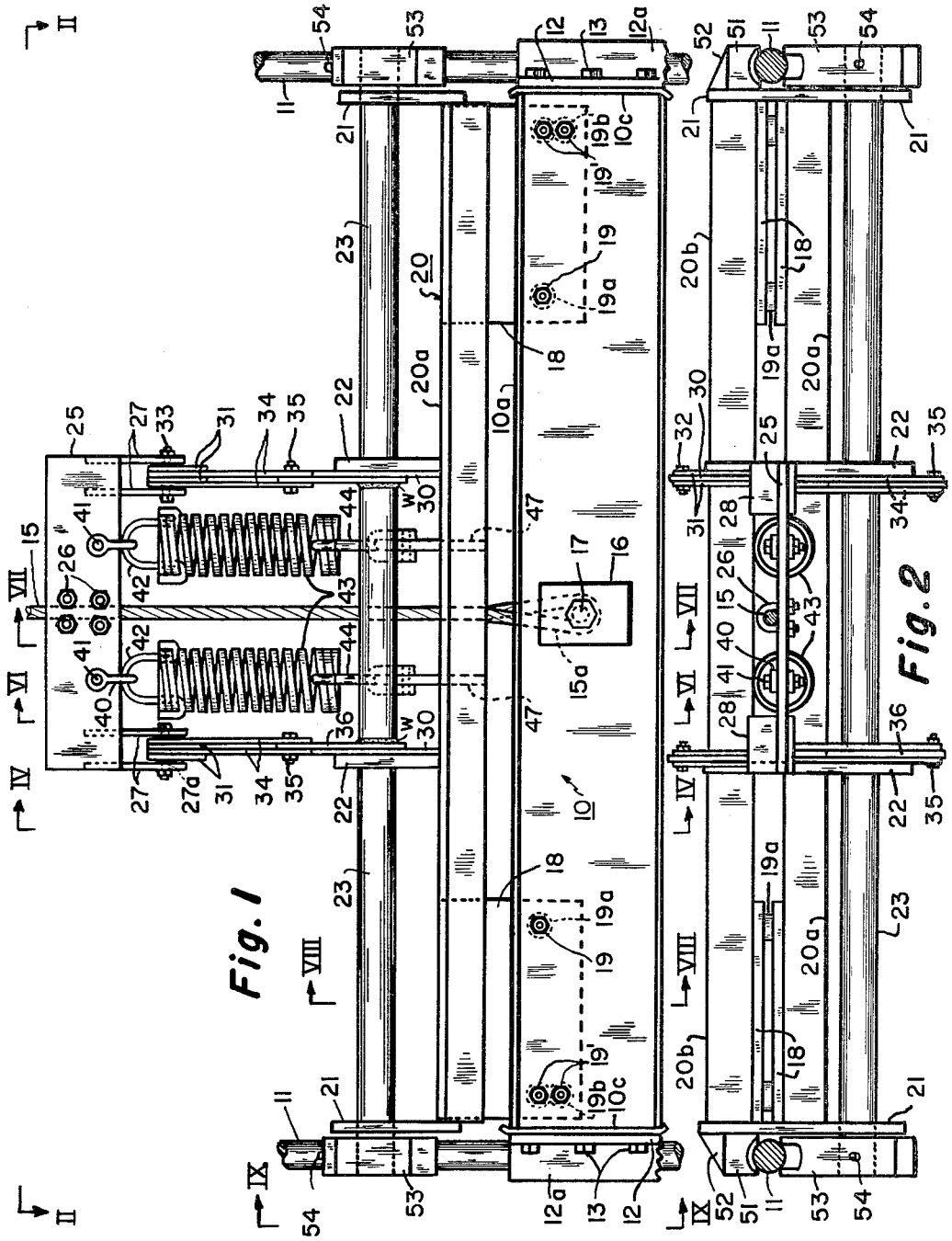
INVENTOR.
Ronald G. Morris
BY Green, McCallister & Miller
HIS ATTORNEYS INVENTOR.
Ronald G. Morris
BY
HIS ATTORNEYS Nov. 30, 1965   R. G. MORRIS   3,220,510
SAFETY APPLIANCE FOR ELEVATORS
Filed April 29, 1963   3 Sheets-Sheet 3

INVENTOR.
Ronald G. Morris
BY Green, McCallister & Miller
HIS ATTORNEYS

United States Patent Office 3,220,510
Patented Nov. 30, 1965

3,220,510
SAFETY APPLIANCE FOR ELEVATORS
Ronald G. Morris, Beaver Falls, Pa., assignor to Beaver-Advance Corporation, Ellwood City, Pa., a corporation of Pennsylvania
Filed Apr. 29, 1963, Ser. No. 276,521
11 Claims. (Cl. 187—86)

This invention relates to an improved safety appliance or device construction for use with an elevator cage or car, such as used in construction work, material handling, etc., to assure that the cage will not fall in the event the hoisting cable breaks, either above the device or between the device and a top of the elevator cage.

Having been active in the field of construction equipment, I have found that there is a need for an improved type of latching device for elevator cages or hoisting towers which will minimize and simplify any necessary adjustments of the device, both in its initial installation and as a part of its maintenance. Further, devices heretofore in commercial use have employed springs in compression which I have found contributes to their early fatigue and failure. Other systems have used only a single operating mechanism, such that if it should fail, the latching device becomes inoperative. I have discovered that by employing a tension spring assembly I have been able to eliminate twist, cut down in the weight of the safety apparatus, and improve the operating life of the springs.

It has thus been an object of my invention to devise a safety appliance or apparatus which will eliminate difficulties heretofore encountered in presently used types and to do so in a simplified manner;

Another object of my invention has been to provide a safety device which is operated through dual or a plurality of mechanisms to assure that at least one of them will operate in the event of cable failure, and to provide a balanced type of and a maximum positiveness and safety of latching action under normal conditions wherein both portions of the device are operative;

A further object has been to devise a new and improved safety apparatus which will eliminate the tendency of twisting during its operation, will be of simplified construction, will provide a maximum positiveness of latching action, and that will make use of a dual-balanced spring relation;

A still further object of my invention has been to provide a locking device which utilizes springs suspended in tension when the device is unlatched and which utilizes the tension force of such springs to positively and substantially instantaneously latch an elevator cage to its rails in the case of cable failure;

A still further object of my invention has been to provide an improved latching element locking action for a safety apparatus that will have a better and more positive gripping action and whose wear surfaces will have an increased operating life;

These and many other objects of my invention will appear to those skilled in the art from the descriptive embodiment and the claims.

FIGURE 1 is a front view in elevation of an apparatus constructed in accordance with my invention, showing it in its normal unlatched relationship, as when the lifting cable of an elevator cage is in a fully operative condition;

FIGURE 2 is a top plan view taken along the line II—II of FIGURE 1 and on the same scale as such figure;

Figure 9:
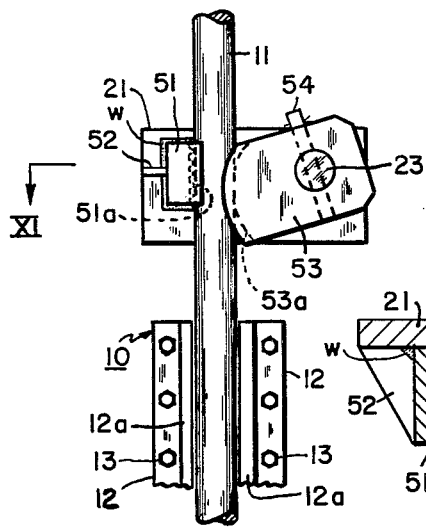
FIGURE 9 is an end view in elevation on the scale of and taken along the line IX—IX of FIGURE 1, illustrating the end mountings and latching element construction of the apparatus; in this view, a cam latch is in a latched or locking position with respect to an associated guide rail of the elevator.
Figure 11:
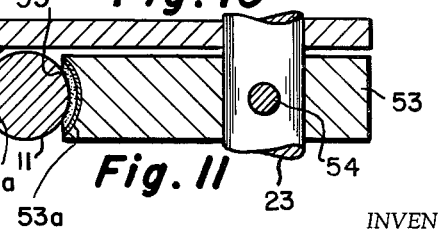

And FIGURE 11 is a fragmental section on an enlarged scale and taken along line XI—XI of FIGURE 9, showing the construction of a gripping face portion and knurled projections of the latching element.

In carrying out my invention, I employ a latching appliance or device which is carried by an overhead, longitudinally-extending frame above the elevator cage and which utilizes a pair of spaced-apart support members in a fully aligned position with respect to and above a top cage support frame of the elevator. The cage support frame is also of two-part construction and is mounted equidistantly from front and back sides of the elevator cage to extend longitudinally thereacross and support it in a balanced relationship therefrom. End connectors are used to connect the top cage frame with the overhead frame of the latching device.

An important phase of the invention deals with an improved safety device construction wherein the device is normally maintained in an unlocked position by the balanced tension of a group or pair of springs. The springs are normally in an extended or expanded relation when the elevator cable is in good working order. The closing force potential of the expanded-tensioned springs is utilized through a pair of lever mechanisms to simultaneously positively actuate a pair of end-positioned, improved locking elements to immediately and positively latch-engage elevator side rails, in the event of failure of the cable above the locking device. The cable is secured both to the locking device and to the top frame of the elevator cage in such a manner that it is directly connected to the elevator at its extreme lower end and is indirectly connected to the elevator at an intermediate portion therealong through the locking device. In addition to providing a dual support for the cable, this type of connection enables the device, itself, to support the elevator cage from the intermediate connecting portion of the cable, if a failure should occur between such portion and the lower end of the cable which is connected directly to the elevator cage.

The operating mechanism of the latching device is mounted on the overhead frame in such a manner that its weight distribution is balanced with respect to the elevator cage. The latching device has a yoke which is secured to the lifting cable and this yoke, in turn, is resiliently-secured to the overhead frame of the device by a pair of opposed and balanced suspension springs which are normally in tension between the yoke and the top frame, in an amount determined by the play in the portion of the hoist cable between its intermediate connection to the yoke and its lower end connection to the top frame of the elevator cage. If the cable should fail between its two points of connection, then the springs will support the elevator cage. If it should fail, as it normally does, above the latching device, then the suspension force exerted by reason of the upper connection of the cable to the yoke of the latching device is released, and the springs which were under tension, collapse in the sense that their convolutions close towards each other to, in turn, actuate a dual lever mechanism and a dual latching mechanism to instantaneously lock the elevator cage to its side rails.

By employing two springs, I have been able to provide a further safety feature as to support, balance the operation, and make them sufficiently light in tension as to avoid lifting an empty elevator cage. In addition, I have provided latching element assemblies at each end of the cage in an operative relationship with respect to an associated guide rail of the elevator, so that should an element of one of the assemblies fail, the other assembly will operate to substantially instantaneously stop the descent of the elevator cage. Also, each braking element assembly employs an adjustable-fixedly-mounted back-up element which serves as a rail-sliding guide element during the normal up and down movement of the elevator cage and which, additionally, serves as a back-up braking, locking or latching element when the elevator cable fails.

Another opposed element of each braking assembly is a swing or pivot cam-like braking, locking or latching element that is normally maintained in a downwardly-projecting non-engaging relationship with the associated guide rail, and is swung, moved, turned, or rotated-upwardly, so that its knurled face engages the rail when the cable fails. Each elevator guide rail is positioned between the fixed and swingable elements of an associated braking assembly, and since both elements are mounted on the same bearing plate, an upward or latching movement of the swingable element will tend to force the face of the fixed element into tight engagement with the guide rail to provide a dual, opposed, braking or latching engagement with opposite sides of the rail. Once the swingable braking element of each assembly has moved upwardly into engagement with its associated guide rail, the weight of the elevator cage and of the safety device carried thereabove will tend to increase the latching action from the standpoint of forcing the swingable latching element further upwardly. It will be noted that stop means limits the maximum upward movement of a crank lever or link of each lever actuating mechanism of the safety device.

Referring particularly to the drawings, I show a top frame structure for an elevator cage which has a top or upper support frame 10 and an overhead support frame 20, both of which extend longitudinally above the elevator cage, of which the frame 10 is a part, and longitudinally thereacross towards side-positioned, vertically-extending guide rails or rods 11. As shown particularly in FIGURES 1 and 6, the frame 10 is made up of a pair of spaced-apart, channel-shaped, load support members 10a and 10b whose webs are in a back to back relation with each other. Opposed end plate members 10c, shown with upper and lower bent-in end portions (see particularly FIGURE 1), are weld-secured to the outer ends of the channel members 10a and 10b to provide a unitary upper frame 10 for the cage. Although as shown, the guide rails 11 are preferably of cylindrical contour or section, they may be of any suitable angular shape, if desired.

A pair of cooperating slide guide mounts or vertically-extending, transversely spaced-apart angle members 12 are shown as removably-secured, as by bolts 13, to the end plate members 10c. Each mount 12 has an outwardly-projecting flange portion 12a that is adapted to slidably-guidably engage with the rails 11 for guiding movement of the elevator cage in its up and down movement therealong. The cage is adapted to be suspended by a lower closed loop or eyelet end portion 15a of a cable 15 (see FIGURES 1 and 7) which is employed for raising and lowering it by conventional means, such as by a motor-driven drum or sheave. The eyelet 15a is shown centrally-secured in position to the elevator cage between the web portions of the beam members 10a and 10b, as reinforced by plates 16, by a bolt and nut assembly 17.

The overhead frame 20 is also shown as having a pair of longitudinally-extending and spaced-apart upwardly-projecting angle support members 20a and 20b whose web portions are in a back-to-back relation with each other. As shown particularly in FIGURES 5 to 8, the beam members of the top frame 20 are in a vertically-aligned and spaced relation above corresponding beam members of the frame 10. Connecting plate pairs 18 are provided adjacent each end of the top frame 20 and, as shown particularly in FIGURE 8, may be weld-secured to the web portions of the angle members 20a and 20b to project downwardly therefrom into an inwardly-abutting relation with the web portions of the beam members 10a and 10b of the frame 10. Bolt and nut assemblies 19 and 19′ are employed with spacer washers 19a and 19b to removably-secure the plate members 18 within the spacing between the beam members of the frame 10. It will thus be seen that the structure provided by the frames 10 and 20 is centrally-disposed in a balanced relationship with respect to the elevator cage and thus, that the cage is suspended substantially centrally from the cable 15. It will be further noted that the connecting member pairs 18 are positioned adjacent opposite ends of the frame structure to rigidly connect the two parts thereof together, so that the overhead frame part 20 is superimposed above the frame part 10.

Figure 3:
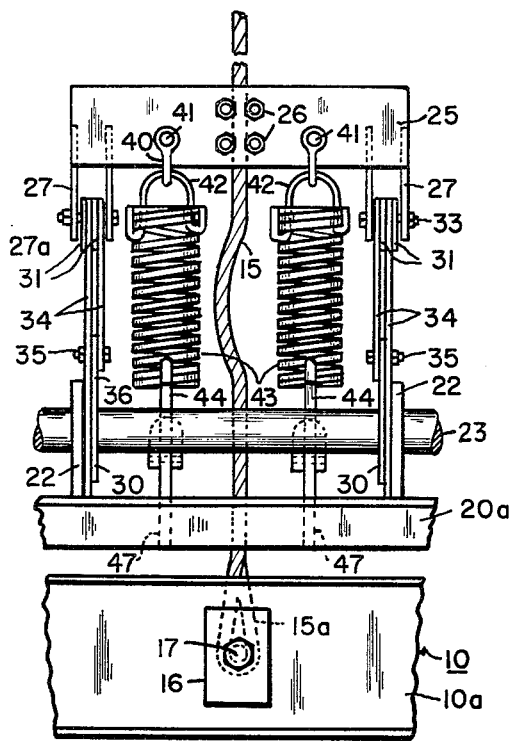
FIGURE 3 is a fragmental front view in elevation through the operating mechanism of the embodiment of FIGURES 1 and 2, showing the mechanism in a downwardly-closed or collapsed relation, as effected by spring force when, for example, the cable has failed above the locking device.
Figure 4:
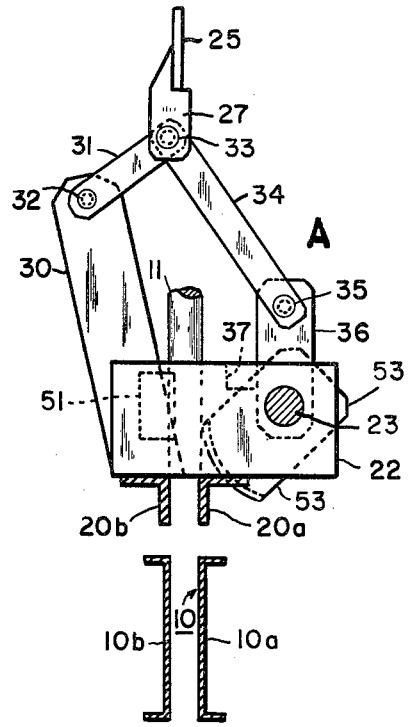
FIGURE 4 is a vertical end section in elevation, on the scale of and taken along line IV—IV of FIGURE 1 and illustrating actuating lever and latching element mechanism in a normal, spread or extended, non-latching position.
Figure 5:
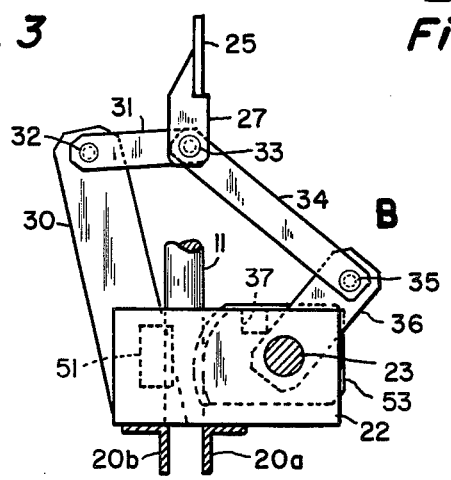
FIGURE 5 is a view similar to FIGURE 4, but showing the actuating lever mechanism in its collapsed or "down" position, corresponding to the position of the mechanism of FIGURE 3, wherein the cage is positively latched in position with respect to its guide rails.

Opposed end bearing plate members 21 are shown weld-secured to opposite ends of the support members 20a and 20b to make the overhead frame 20 of unitary construction and to provide bearing plates for opposite end portions of a longitudinally-extending operating shaft 23. The shaft 23 is positioned above the frame 20 and, as shown in FIGURES 4 and 5, in a transversely-forwardly offset relation with respect to a vertical plane of the frames 10 and 20. It will be noted that the opposed end bearing plate members 21 are weld-secured to ends of and project upwardly from top flanges of support members 20a and 20b, as are a pair of centrally-disposed, spaced-apart, inner bearing plate members 22. The pair of inner bearing plate members 22 extend transversely of a mid-portion of the frame 20, and each has a journal bore within which central portions of the shaft 23 extend and by which it is rotatably carried.

Figure 7:
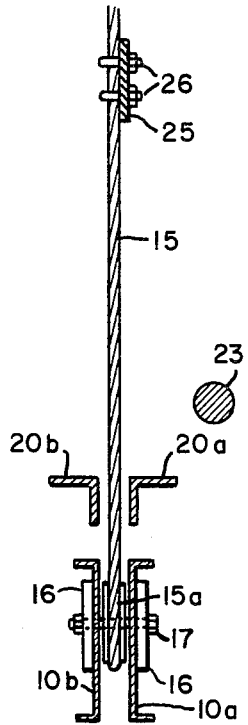
FIGURE 7 is a fragmental vertical section taken along the line VII—VII of FIGURE 1 and on the same scale as such figure, showing the two points of support or connection of the cable from the standpoint of the elevator cage.
Figure 8:
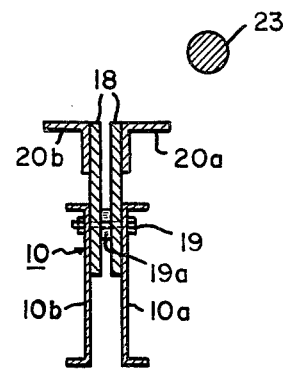
FIGURE 8 is an end or transverse section on the scale of and taken along the line VIII—VIII of FIGURE 1, showing details of end connections between an overhead frame of my latching device and a top frame of the elevator cage.

A suspension or relatively short-length yoke member 25 extends longitudinally of the overhead frame 20 and is positioned centrally thereabove. A pair of vertically spaced-apart U-shaped clamping bolt and nut assemblies 26, as shown particularly in FIGURES 1, 2, and 7, are employed to secure an above-positioned or upwardly-spaced portion of the cable 15 to the suspension member 25. It will be noted that the cable 15 may be provided with some play as to its length portion between its point of connection to the suspension member 25 and its lower end point of connection to the frame 10, so as to permit a desired tensioned upward extension or expansion of the convolutions of a pair of balanced springs 43 which provide spring means connected in a balanced relation between the suspension member 25 and the frame 20. The suspension or yoke member 25, at each of its opposite end portions, carries a mounting bracket 27 that is of U-shape by reason of its pair of downwardly-projecting legs. The legs of each bracket 27 project from the underside of the suspension or yoke member 25 and may be secured thereto by any suitable means such as weld metal (see particularly FIGURE 1).

An operating lever means or mechanism is operatively-positioned between each mounting bracket 27 and the shaft 23, on opposite sides of the springs 43, in such a manner as to effect an actuation or turning movement of the shaft 23 when the cable 15 fails above the suspension member 25 and the springs 43 close or contract downwardly under their tension force to draw the member 15 downwardly towards the frame 20.

As shown particularly in FIGURES 1, 4, and 5, each lever means has an anchor plate member or arm 30 which, at its lower end portion, is secured to an associated bearing plate 22 along its side and adjacent its outer end portion to project upwardly and in an inclined outward relation therefrom. A lower end portion of each anchor plate 30 is inclined to rest upon the top flange of the beam member 20b, so that the anchor plate may be weld-secured thereto as well as the associated bearing plate 22. The upper end portion of the anchor member 30 of each lever means is pivotally-connected by a pin or bolt assembly 32 to outer ends of a first pair of link or lever members 31. Inner end portions of the first pair of links 31 are pivotally-connected by a pivot pin or bolt assembly 33 within an associated bracket 27 (see particularly FIGURE 1). A second and forwardly-downwardly extending pair of link or lever members 34 is connected at its upper end portion on the same pivot pin assembly 33 within the same associated bracket 27 and projects forwardly and downwardly therefrom. The lower ends of the second pair of links 34 are pivotally-secured by bolt or pin assemblies 35 to an upper end portion of a crank lever or link 36 which is of relatively shorter length.

The lower end portion of the crank lever 36 of each lever means is secured, as by welding w, on the shaft 23 for actuating it when the lever means is moved from its upwardly-extended or expanded position A of FIGURE 4 to its downwardly-contracted or lower position of B of FIGURE 5. Each lever means is positively-actuated by the down-return action of the springs 43 to turn or actuate the shaft 23 for applying braking means. To limit the maximum upward movement of each lever means, a rectangular-shaped stop piece 37 is weld-secured to project from the inner side of each inner bearing plate member 22 adjacent the crank 36 to, at position A of FIGURE 4, abut the inner longitudinal edge of the crank 36 when it is in a fully vertical position. At the same time, the stop 37 permits the crank 36 to move to its downwardly-outwardly-inclined shaft-actuating position B of FIGURE 5 without interference.

Figure 6:
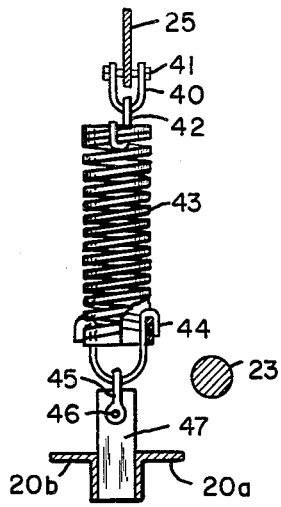
FIGURE 6 is a vertical end section on the scale of and taken along the line VI—VI of FIGURE 1, showing details of the construction and mounting of springs of the locking device.

As shown particularly in FIGURES 1, 2, and 6, spiral springs 43 provide a braking movement of the lever means and are normally in an upwardly-extended or expanded-tensioned relation, as effected by their connected suspension to the suspension or yoke member 25 which is, in turn, suspended from or carried by the cable 15. As shown particularly in FIGURE 1, the springs 43 are positioned along opposed sides of the cable 15 and preferably have square-end convolutions to reinforce or strengthen them at their points of connection between the top frame 20 and the suspension yoke or member 25.

U-shaped hangers, clevises or shackles 40 project downwardly in a longitudinally-spaced and balanced relation with respect to each other from the yoke member 25. Each hanger 40 has a pin 41 which extends through its upper leg portions and connects it to the suspension member 25. Each pin 41 may be headed at one end and have a cotter pin and washer assembly at its other end. A U-shaped hook 42 is connected at its loop end with loop of an associated hanger or hook 40 and has bent-over hook end portions to engage within end convolutions of an upper end of an associated spring 43. A similar type of hook 44 is provided for the opposite or lower end of each spring 43 to project downwardly therefrom and loop through a lower, U-shaped hanger, clevis or shackle 45 that is secured to an upwardly-projecting mounting piece 47 by a pin 46 which may correspond in construction and mounting to the upper pin 41.

Each mounting piece 47 has a thickness corresponding to the spacing between the web portions of the angle members 20a and 20b, and as shown particularly in FIGURE 6, projects downwardly therebetween and is weld-secured thereto. It will be seen that the springs 43 will suspend the frame 20 and carry the load, if the cable 15 should fail between the suspension yoke 25 and the frame 10. On the other hand, if the cable fails above the suspension yoke 25, the springs 43 are constructed to draw the yoke 25 downwardly, upon its release due to the suspension failure of the cable, and thus draw the lever means downwardly or close such means like a mouse trap to actuate the operating shaft 23 for positively effecting braking action which will be hereinafter described.

Referring particularly to FIGURES 1, 2, and 9, a braking assembly is provided at each end of the frame 20 and the shaft 23. A back-up braking element 51 of each assembly is shown as secured by weld metal w in a fixed relation on an associated end bearing plate member 21. The element 51 has a reinforcing projection or gusset plate 52 and a bore 51a of somewhat complementary shape or curvature with respect to the shape or curvature of an associated guide rail 11 with which it is normally in a guided-slidable relation. A cam-like, swingable braking, latching or locking element 53 of each assembly is secured, as by a pin 54 to an associated end portion of the shaft 23 ( see FIGURES 10 and 11), and is normally in the disengaged or "down" position indicated in FIGURE 4 when the cable 15 is in good working order. However, when the cable 15 fails above the suspension or yoke member 25, the lever means, working through or actuating the shaft 23, causes the swingable braking element 53 to turn upwardly (as shown in FIGURE 9) into engagement with the associated rail 11. Due to the opposed relationship of the element 53 with respect to the element 51, this upper engagement of the element 53 causes the fixed element 51 also to be moved into braking engagement on an opposite side of the rail 11. Although each guide mount 12 is mounted as shown in FIGURE 1 in close adjacency with the braking elements 51 and 53 to thus maintain positive sliding movement with the associated guide rod 11, this does not prevent a pull of the bearing plate 22 towards the element 53 to thus move the fixed element into engagement with the associated guide rod when the element 53 is moved into its braking position of FIGURE 9. The braking means thus substantially instantaneously lock-engages the rail 11 and thus holds the elevator cage in position with respect thereto.

Figure 10:
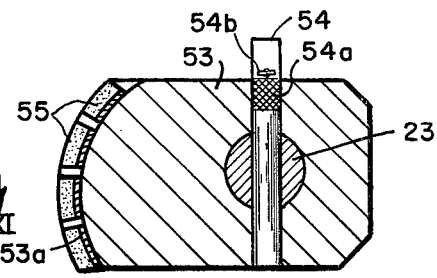
FIGURE 10 is an enlarged vertical section through the latching element shown in FIGURE 9.

As shown particularly in FIGURES 9 to 11, the swing braking element 53 has a curvilinear braking face or jaw portion 53a that is curved convexly between its top and bottom sides or edges, and is curved concavely-transversely of its thickness in a substantially complementary manner with respect to the curvature of the associated guide rail 11. Spaced knurls or rib-like projections 55 are formed or provided on the face 53a and extend laterally or crosswise between its opposed vertical side faces. The ribs 55 may be provided by weld metal ring segments of stainless steel in a vertically-spaced relation with each other along the face 53a to provide a long-wearing, improved type of biting action on the guide rails 11. The angular relation of the ribs 55 is preferably about 45° as compared to the usual 20° of prior constructions. The construction of my invention now permits the appliance to be adjusted or pre-set at the factory, so that prior difficulties with field adjustments are eliminated.

As shown particularly in FIGURES 9 and 11, the fixed braking element 51 may also be provided with spaced knurls or rib-like projections 51a, shown as five built-up ridges of weld metal on its inside concave face, for increasing the gripping action when the swing braking element or part 53 has moved to its locking position of FIGURE 9. As shown particularly in FIGURE 11, the projections 51a may be provided in the same manner as and may be of the same general type as the projections 55 of the swing element 53. With reference to FIGURES 9 and 10, the pin 54 is shown knurled at 54a and as provided with a cotter pin 54b extending transversely through its upper end. This assures the retention of the pin 54 during the operation of the swing element 53, but permits the swing element to be easily removed for replacement or repair.

What I claim is as follows:

1. In a safety appliance for an elevator installation having a cage suspended from a cable and having guide rails along opposite sides of the cage for guiding it in its up and down movement with respect thereto as effected by the cable, a frame secured to project upwardly from the cage and having means for connectig a lower end portion of the cable thereto, a pair of bearing plate members secured to project upwardly adjacent opposite ends of said frame, a shaft operatively carried by said end plate members to extend longitudinally across said frame towards the guide rails, braking means operatively carried by said shaft for swinging movement into and out of engagement with at least one of the guide rails, a suspension member adapted to be secured to and carried from the cable in a spaced relation above said frame, spring means connected in a balanced relation between said suspension member and said top frame, lever means operatively connected between said suspension member and said shaft for downwardly actuated movement with said suspension member upon failure of the cable, said suspension member when carried by the cable being constructed to normally maintain said spring means in an upwardly-expanded-tensioned relation with respect to said frame, said spring means being constructed to support said frame from said suspension member upon failure of the cable between its connection to said suspension member and its connection to said frame, said spring means being constructed to contract downwardly to pull said suspension member toward said frame and thereby actuate said lever means and said shaft when said suspension member is released by failure of the cable thereabove, said braking means being actuated by said lever means and said shaft upon the failure of the cable above said suspension member to move into braking engagement with at least one of the guide rails for retaining the cage in a locked position with respect thereto; said lever means comprising, at least one centrally-disposed bearing plate carried by said frame, an anchor member projecting upwardly adjacent one end of and secured to said centrally-disposed bearing plate, a first link means pivotally-connected between an upper end portion of said anchor member and said suspension member, a second link means at one end pivotally connected with respect to said first link means and said suspension member, a crank lever secured at one end to said shaft to project upwardly therefrom, and said crank lever being pivotally connected at its upper end to a lower end of said second link means.

2. In a safety appliance as defined in claim 1 wherein, said lever means has a pair of means of the defined construction and mounting that have a spaced relation with each other longitudinally of said shaft and are pivotally-connected at opposite end portions of said suspension member on opposite sides of said spring means.

3. In a safety appliance for an elevator installation having a cage suspended from a cable for up and down movement along guide rails disposed along opposite sides of the cage, a frame secured to project upwardly from the cage, a pair of end plate members secured adjacent opposite end portions of said frame in an adjacent relationship with the guide rails, a shaft journaled by said end bearing plate members adjacent its opposite end portions, at least one braking assembly, said braking assembly having a back-up element secured on one of said end plate members adjacent one side of an associated guide rail and having a face corresponding substantially in shape to the shape of the guide rail for guided movement therealong, said braking assembly having a swing element secured on an end portion of said shaft in an opposed relation with respect to said back-up element for upward swinging movement into braking engagement with the associated guide rail and for pulling said end plate member towards said swing element to move said back-up element into an opposed braking engagement with the associated guide rail, a suspension member adapted to be secured to and carried by the cable in a spaced relation above said frame, spring means connected between said suspension member and said top frame in a normally expanded-tensioned relationship with respect to said frame, lever means operatively connected between said suspension member and said shaft; said lever means comprising, at least one centrally-disposed bearing plate carried by said frame and rotatably-receiving said shaft, an anchor member projecting from said bearing plate, a first link means pivotally-connected between an upper end portion of said anchor member and said suspension member, a second link means at one end pivotally connected to said first link means and said suspension member, a crank member secured at one end to said shaft and pivotally connected at its other end to the other end of said second link means; and said spring means being constructed to contract and pull said suspension member towards said frame for actuating said lever means and said shaft when said suspension member is released by failure of the cable, and said swing element being swung into braking engagement with the associated guide rail when said suspension member is pulled towards said frame.

4. In a safety appliance for an elevator installation having a cage for suspension from a cable, having guide rails along opposite sides of the cage and having a frame secured to project upwardly from the cage, a shaft operatively-carried for turning movement on said frame and extending thereacross towards the guide rails, braking means operatively-carried by said shaft for movement into and out of braking engagement with at least one of the guide rails, a suspension member adapted to be secured to and freely carried by the cable in a spaced relation above and with respect to the frame, spring means connected in a centrally-balanced relation between said suspension member and said frame, said suspension member when carried by the cable being constructed to normally maintain said spring means in an expanded-tension relation with respect to the frame, lever means having a bearing plate secured to and carried in a projecting relation by the frame, an anchor plate projecting upwardly from said bearing plate; and linkage pivotally-connected at one end to an upper portion of said anchor plate, securely connected at its opposite end for turning said shaft, and pivotally-connected at an intermediate pivot point to said suspension member.

5. In a safety appliance as defined in claim 4 wherein, said swingable braking element of each of said braking assemblies has an end braking face portion of convex shape along its length and of concave shape transversely of its width, and rib segments of stainless steel extend transversely across its concave shape in a spaced relation of its length.

6. In a safety appliance for an elevator installation having a cage suspended from a cable and having guide rails along opposite sides of the cage, a frame secured to project upwardly from the cage, a single shaft operatively-carried by said frame for turning movement and extending longitudinally thereacross towards the guide rails; a pair of braking means, one of which is operatively carried by said shaft adjacent one end thereof and the other of which is operatively carried by said shaft adjacent the opposite end thereof for movement into and out of braking engagement with the guide rails; a suspension member adapted to be secured to and freely carried by the cable in a spaced relation above and with respect to said frame, spring means connected in a centrally balanced relation between said suspension member and said frame, said suspension member when carried by the cable being constructed to normally maintain said spring means in an expanded-tensioned relationship with respect to said frame, lever means operatively-connected between said suspension member and said shaft, said spring means being mounted independently of said shaft and said lever means and being constructed to contract and pull said suspension member towards said frame for actuating said lever means and said shaft when said suspension member is released by failure of the cable thereabove, said braking means being moved by the actuation of said shaft into braking engagement with the guide rails for retaining the cage in a locked position with respect to the guide rails, said lever means having sets of lever members operatively-connected adjacent opposite end portions of said suspension member to said shaft, and said frame having a pair of projecting anchor arms each of which pivotally mounts one end of one set of said lever members.

7. In a safety appliance for an elevator installation having a cage suspended from a cable and having guide rails along opposite sides of the cage, a frame secured to project upwardly from the cage, a single shaft operatively carried by said frame for turning movement and extending longitudinally thereacross towards the guide rails; a pair of braking means, one of which is operatively carried by said shaft adjacent one end thereof and the other of which is operatively carried by said shaft adjacent the opposite end thereof for movement into and out of braking engagement with the guide rails; a suspension member adapted to be secured to and freely carried by the cable in a spaced relation above and with respect to said frame, spring means connected in a centrally balanced relation between said suspension member and said frame, said suspension member when carried by the cable being constructed to normally maintain said spring means in an expanded-tensioned relationship with respect to said frame, lever means operatively-connected between said suspension member and said shaft, said spring means being mounted independently of said shaft and said lever means and being constructed to contract and pull said suspension member towards said frame for actuating said lever means and said shaft when said suspension member is released by failure of the cable thereabove, said braking means being moved by the actuation of said shaft into braking engagement with the guide rails for retaining the cage in a locked position with respect to the guide rails, a pair of bearing plates secured to project upwardly from said frame in a transversely spaced-apart relation with each other, said shaft being rotatably positioned to extend through said bearing plates, said lever means having spaced-apart pairs of pivotally-interconnected assemblies, and each of said bearing plates having an anchor member projecting upwardly therefrom and pivotally connected to one end of one of said link assemblies.

8. In a safety appliance for an elevator installation having a cable-suspended cage and opposed vertical guides along opposite sides thereof for guiding the cage in up and down movement therealong, a longitudinal frame projecting upwardly from the cage, a longitudinal suspension member adapted to be centrally-secured to and carried by the cable in a spaced relation centrally above said frame, a pair of mounting brackets secured adajcent opposite longitudinal ends of said suspension member, spring means operatively-connected in a balanced relation between said suspension member and said frame, said suspension member as carried by the cable being constructed to normally maintain such spring means in a tension-spread relation above said frame, a pair of anchor elements centrally-secured in a spaced relation longitudinally of and to project upwardly from said frame, one of said anchor elements being positioned in substantial vertical alignment with one of said brackets and the other of said anchor elements being positioned in substantial vertical alignment with the other of said brackets, said anchor elements having bearing means, a shaft operatively-carried by said bearing means above said frame to extend longitudinally therealong; a pair of braking element assemblies, one of which is operatively carried by said frame adjacent one longitudinal end thereof and the other of which is operatively carried by said frame adjacent the other longitudinal end thereof; each of said braking assemblies having a swingable braking element secured on an associated end portion of said shaft for movement into and out of braking engagement with an adjacent one of the vertical guides; a pair of lever means, one for each of said anchor elements and the associated vertically-aligned bracket; each of said lever means having a pair of links pivotally-secured together at their upper ends and to the associated vertically-aligned bracket, one of said links being pivotally-connected at its lower end to an associated anchor element and the other of said links being operatively-connected at its lower end to said operating shaft for turning it, and said pair of lever means being actuated by a downwardly retractive movement of said spring means to turn said shaft and said swingable braking elements into braking engagement with the opposed vertical guides when suspension force exerted by the cable on said suspension means is released due to failure of the cable thereabove.

9. In a safety appliance as defined in claim 8 wherein, each of said brackets has a pair of spaced-apart downwardly-projecting legs, and the pair of links of each of said lever means is pivotally secured at their upper ends between the pair of legs of the associated one of said brackets.

10. In a safety appliance as defined in claim 8 wherein a pair of bearing plates are secured to project upwardly from said frame adjacent opposite ends thereof, and said shaft is rotatably positioned to extend through said bearing plates adjacent said braking element assemblies.

11. In a safety appliance as defined in claim 8 wherein, the vertical guides have a rounded contour, each of said braking elements has a vertically-convex and a transversely-concave braking face, and said braking face of each of said braking elements has a group of vertically spaced-apart and transversely-extending rib segments of a wear-resisting metal weld-secured thereto.

References Cited by the Examiner
UNITED STATES PATENTS

| | | | |
|---|---|---|---|
| 763,144 | 6/1904 | Bremer | 187—87 |
| 953,537 | 3/1910 | Lozaw | 187—87 |
| 1,219,918 | 3/1917 | Coates. | |
| 2,804,175 | 8/1957 | Phillips | 187—86 |

FOREIGN PATENTS

| | | |
|---|---|---|
| 10,954 | 1894 | Great Britain. |

SAMUEL F. COLEMAN, *Primary Examiner.*